UNITED STATES PATENT OFFICE.

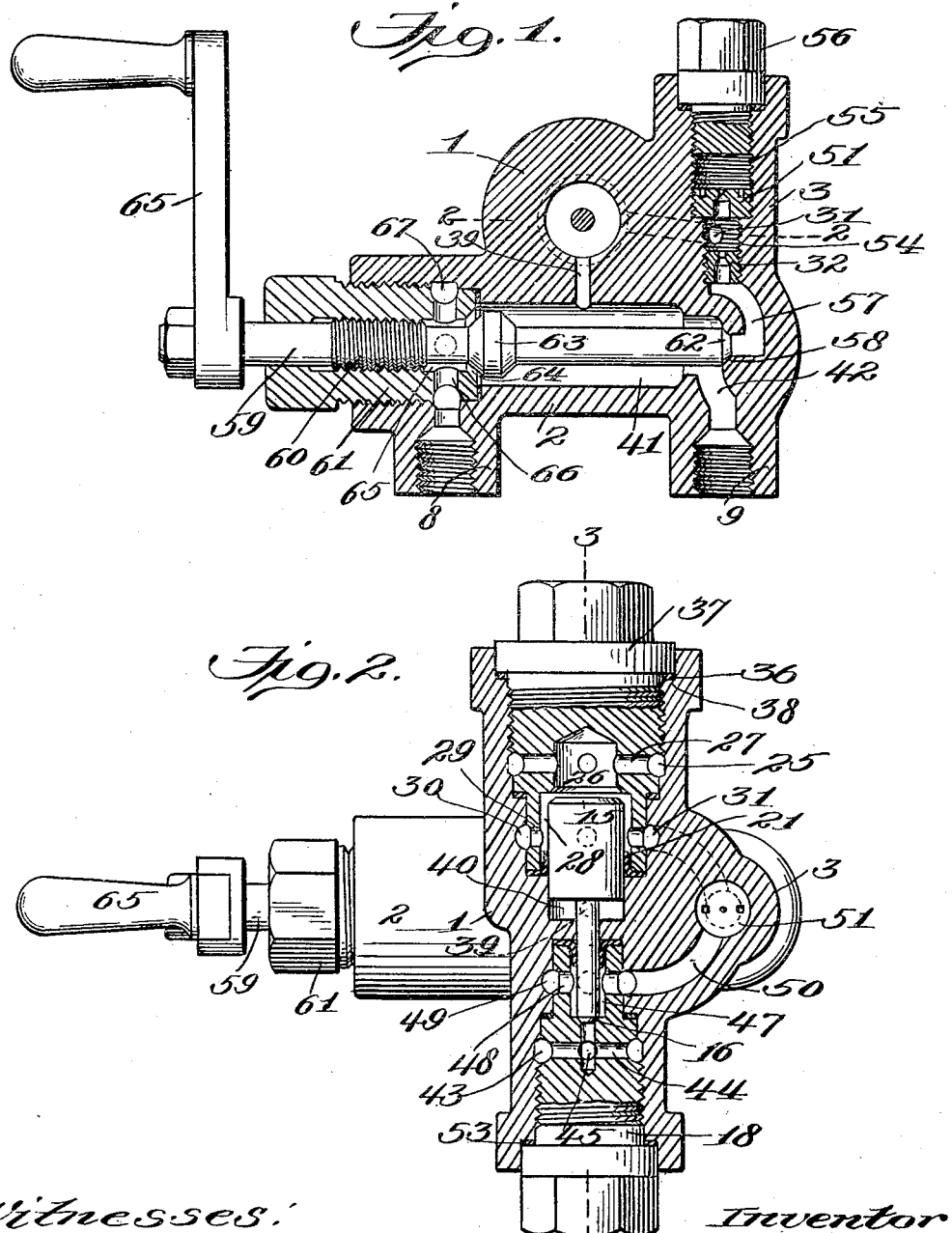

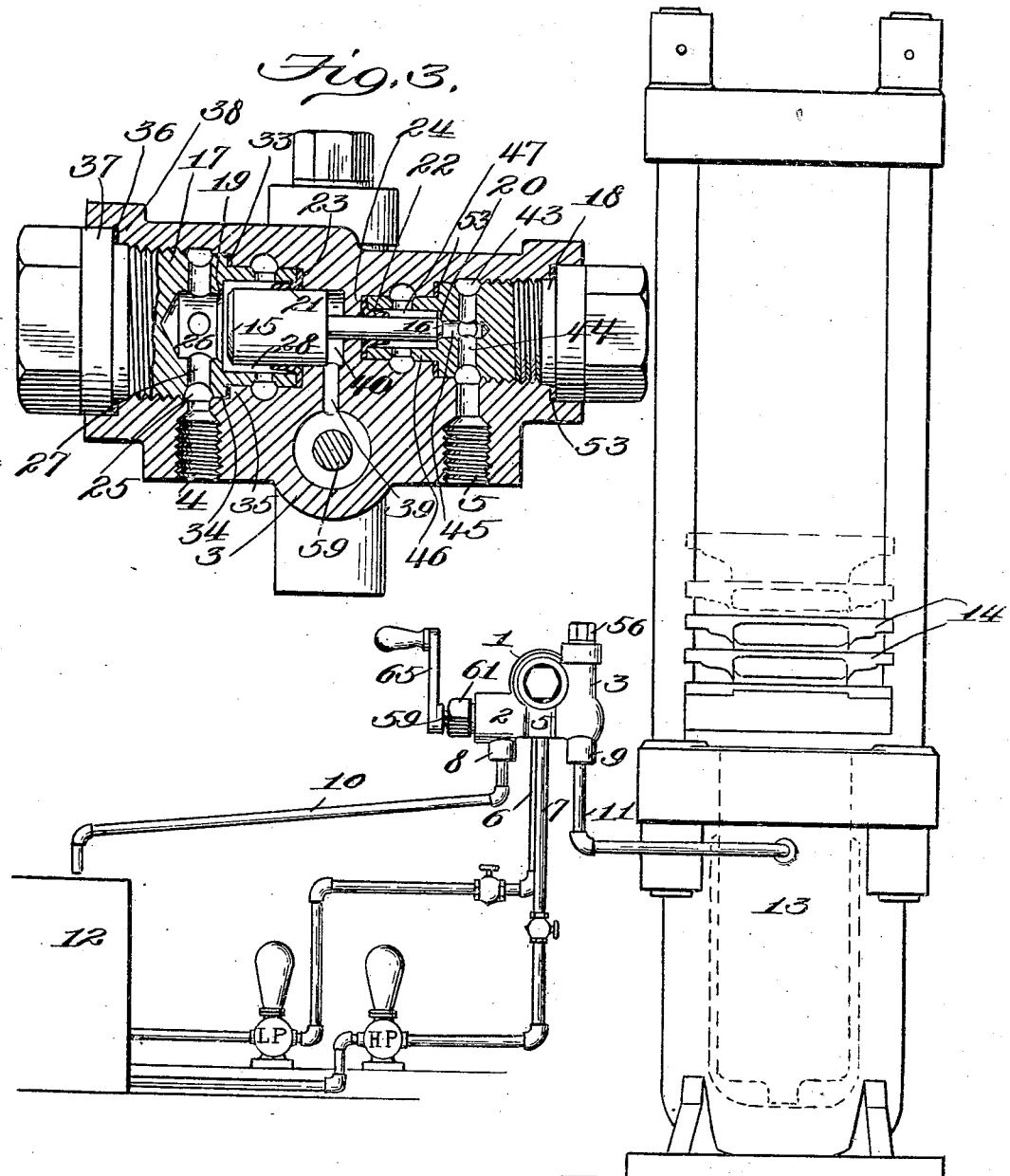

ELLIS BRYAN ANDERSON, OF JACKSON, MISSISSIPPI.

AUTOMATIC CHANGE-VALVE FOR PRESSES.

946,481.          Specification of Letters Patent.          Patented Jan. 11, 1910.

Application filed June 11, 1909. Serial No. 501,544.

*To all whom it may concern:*

Be it known that I, ELLIS BRYAN ANDERSON, a citizen of the United States, residing at Jackson, in the county of Hinds and State of Mississippi, have invented new and useful Improvements in Automatic Change-Valves for Presses, of which the following is a specification.

My present invention relates to improvements in change cocks or valves for hydraulic presses and it is more especially applicable to presses of the class employed in expressing oil from cotton seed, and the invention has for its object primarily to provide a simple and efficient valve or cock of this class which is operative automatically to admit the low and high pressure fluid successively to the press cylinder, the low pressure fluid alone being utilized to effect the expressing operation until the pressure accumulated in the press cylinder approximates the initial pressure of the low pressure fluid whereupon the valve will operate automatically to cut off the low pressure fluid and admit the high pressure fluid to the press cylinder to complete the expressing operation, the valve being so constructed that the high pressure fluid is not wasted either during the first portion of the expressing operation or during the change from the low pressure into the high pressure, nor is there any interruption in the action of the press which might cause the oil to cease flowing from the seed, while on the other hand the valve so operates that an excessive pressure cannot be developed so that there is no liability of disrupting or damaging the press cloths.

Another object of the invention is to provide a simple and efficient valve or cock of this class which is composed of a few parts which are not liable to become clogged or to get out of order and one which acts with certainty, the parts of the valve being so constructed and proportioned that it is unnecessary to make and adjustments, it having proven objectionable to employ valves which in the hands of unskilled labor, are quickly put out of order.

A further object of the invention is to provide a change cock or valve for presses wherein the chokers for the high and low pressure fluids are mounted in a novel manner and which are so proportioned as not to require adjustment.

It is also an object of the invention to improve the general construction of the valve whereby it may be simplified and cheapened and is not liable to become clogged or to get out of order through continuous use.

To these and other ends, the invention consists in certain improvements, and combinations and arrangements of parts, all as will be hereinafter more fully described, the novel features being pointed out particularly in the claims at the end of the specification.

In the accompanying drawing: Figure 1 represents a section of a valve constructed in accordance with my present invention, the section being taken through the release valve and the chokers; Fig. 2 represents a section of the valve taken on the line 2—2 of Fig. 1; Fig. 3 represents a section of the valve taken on the line 3—3 of Fig. 2; and Fig. 4 is a diagrammatic view showing the manner in which the change valve or cock may be connected to the press and to the high and low pressure pumps and release tank.

Similar parts are designated by the same reference characters in the several views.

In extracting oil from cotton seed, it has been found essential to maintain a constant compression upon the seed whereby the oil will flow continuously or without interruption from the seed and it is also important that an excessive pressure be avoided as the result of an excessive pressure is to damage or destroy the press cloths. The compression necessary at the beginning of the expressing operation requires less power than toward the completion of such operation and for this reason, a fluid under different pressures is usually employed, the low pressure fluid serving to effect the first part of the expressing operation, while the high pressure fluid completes the expressing operation.

The present invention provides a valve or cock which is operative automatically to admit the low pressure fluid to the press so that the oil may be extracted properly from the seed during which part of the operation the high pressure fluid is cut off from the press and when the pressure in the press cylinder reaches, say, two-thirds of that of the low pressure fluid, the valve acts automatically to cut off the further supply of low pressure fluid from the press and to simultaneously admit the high pressure fluid thereto whereby the expressing operation is completed without any interruption, and during the change from the low to the high pressure, there is no appreciable waste of the high pressure fluid. Moreover, the arrangement of the chokers according to the present invention is such that an excessive compression upon the seed is avoided so that there is no danger of damaging or destroying the press cloths.

In the drawing I have shown a valve which is especially adapted for use in connection with presses for the extraction of oil from cotton seeds, but it will be understood that the invention is not necessarily limited for use in this particular connection and, moreover, the drawing shows but one embodiment of the invention as an example, as certain modifications and changes may be made therein in order that the invention may be applied to the best advantage in each particular case.

In the present instance the valve comprises a casing which may be of any suitable construction, it comprising in the present embodiment of the invention a section 1 to contain the controlling valves for the low and high pressures, a section 2 arranged preferably at right angles to the section 1 and containing the releasing valve, and a section 3 to contain the chokers and the passages connecting the chokers with the high and low pressure valves and the press cylinder. The section 1 is provided with suitable connections 4 and 5 to which are attached the pipes 6 and 7 which serve to conduct respectively the low and high pressure fluids to the valve, and the section 2 which contains the releasing valve is provided with suitable connecting means 8 and 9 to which are connected the pipes 10 and 11 leading respectively to the release tank 12 and the press cylinder 13.

The valve may be used in connection with presses of various kinds, that shown in the present instance being typical of presses such as are commonly employed in the extraction of oil from cotton seed, the seed being contained in the press boxes 14.

Within the section 1 of the casing is mounted a member which carries valves for controlling both the low and high pressure fluids and which member is operable automatically owing to the pressure of the fluid accumulated in the press cylinder whereby the low pressure is disconnected therefrom and the high pressure is admitted thereto. This member in the present instance consists of a relatively large valve 15 which controls the admission of the low pressure fluid to the press cylinder and a suitably proportioned smaller valve 16 which controls the admission of high pressure to the press cylinder. The areas of the valves 15 and 16 are determined according to the relative pressure of the high and low pressure fluids and when once determined they are fixed, no subsequent adjustment being necessary and hence derangement of the valve in the hands of unskilled persons cannot occur.

In order to facilitate the manufacture of the valve and to enable the valve to be readily repaired, should it become necessary, the seats for the low and high pressure valves in the present instance are shown as formed separately from the body of the casing, plugs 17 and 18 being threaded into the opposite ends of the section 1 of the casing and having seats 19 and 20 formed thereon to coöperate with the low and high pressure valves 15 and 16, respectively, the low pressure valve being unseated and the high pressure valve seated when the valve member occupies one position, while the reverse is true after the valve member has shifted whereby the low pressure fluid is cut off and the high pressure fluid is admitted to the press cylinder. Those portions of the valve member carrying the valves 15 and 16 are formed as pistons and a fluid-tight fit is provided for each of these pistons by the packing cups 21 and 22 which in the present instance are clamped between the inner ends of the plugs 17 and 18 and the shoulders 23 and 24 respectively, formed within the casing, these packing cups also serving to provide a fluid-tight fit between the inner ends of the two plugs and the casing.

The inlet 4 for the low pressure fluid communicates with a circumferential passage 25 which is formed by grooving the exterior of the plug 17, and this plug has a central chamber 26 which is connected to the circumferential passage 25 by a suitable number of radial or inwardly extending passages 27. That portion of the plug 17 containing the piston for the low pressure valve 15 is larger than the chamber 26, thus forming a chamber 28 which latter communicates through suitable radial passages 29 with a circumferential passage 30, and this circumferential passage 30 in turn communicates through a port 31 with a low pressure choker 32.

In order to properly pack the plug 17 to prevent leakage of fluid between it and the casing, a packing ring 33 is interposed between a shoulder 34 on the plug and a coöperating shoulder 35 on the casing, and an additional packing ring 36 may be interposed between the head 37 of the plug and an outer shoulder 38 of the casing, these shoulders on the plug and casing being so related that a tightening of the plug and the casing will simultaneously compress all of the packing devices. That portion of the casing in which the piston carrying the low pressure valve 15 operates is chambered to permit a reciprocation of said piston, and that side of the piston opposite to the end on which the valve 15 is arranged is acted on by the fluid in the press cylinder through a passage 39 which leads into the chamber 40 in rear of said piston, and from a chamber 41 in the section 2 which contains the releasing valve, this chamber 41 being connected to the press cylinder through a passage 42 which leads to the connection 9 which receives the pipe 11 leading to the press cylinder.

The plug 18 containing the seat for the high pressure valve has a circumferential groove therein forming an annular passage 43 which is connected to receive the high pressure fluid entering the casing through the pipe connected to the coupling 5, and a suitable number of radial or inwardly extending passages 44 conduct the high pressure fluid to an interior chamber 45 within this plug. The inner end 46 of the plug extends beyond the seat 20 for the high pressure valve and is sufficiently large to form an annular chamber 47 which chamber is connected through a suitable number of radial passages 48 with an annular passage 49, the latter being connected through the medium of the port 50 to the high pressure choker 51. The plug 18 is also suitably packed so as to prevent leakage of the fluid between it and the casing, packing rings 52 and 53 being shown similar to those provided for the plug 17 and all of the packing devices for the plug 18 may be simultaneously tightened when the plug is screwed into place.

In the present instance the chokers for the low and high pressure fluids are of a fixed size so that after the sizes of the chokers have been properly determined it is unnecessary to alter or adjust the chokers in any way, it being impossible for unskilled persons to derange the valve. In the present instance, these chokers are mounted in a simple and efficient manner, the section 3 of the casing in the present instance being threaded first with a thread 54 of a relatively small diameter and then with a thread 55 of a relatively larger diameter, the choker 32 for the low pressure fluid being screwed into the threaded part 54 and the choker 51 for the high pressure being then screwed into the larger threaded bore 55, the high pressure choker seating on a shoulder formed between the two bores. A plug 56 may be threaded into the outer end of the bore 55 so as to close the same. The port 50 leading from the high pressure valve enters the space above the high pressure choker 51, while the port 31 for the low pressure fluid leads into the space above the low pressure choker 32. A passage 57 leads from the discharge side of the low pressure choker 32 to a valve seat 58, this valve seat being provided with a valve which serves to cut off both high and low pressure fluids to the press cylinder during the releasing operation and preparatory to the next expressing operation. According to the present invention, I provide a member which serves to control both the admission of the fluid to the press cylinder and the releasing of the fluid therefrom, this member in the present instance consisting of a stem 59 which for convenience may be provided with a thread 60 which coöperates with a thread in a plug 61, the latter being preferably threaded into the casing. The stem 59 is provided at its end with a valve 62 which is arranged to coöperate with the valve seat 58 to cut off the admission of fluid to the press cylinder and the stem also carries a valve 63 which is arranged to coöperate with a valve seat 64 formed preferably on the inner end of the plug 61, this latter valve serving to control the release of fluid from the press cylinder. The outer end of the stem 59 is provided with a handle or other suitable operating device 65, and when the stem is moved in one direction, the valve 62 will interrupt the admission of fluid from the press cylinder and simultaneously the valve 63 will leave its seat 64 and thereby permit a release of the fluid from the press. A reverse movement of the member 59 will seat the valve 63 to prevent the release of fluid from the press cylinder and at the same time the valve 62 will leave its seat and thereby admit fluid to the press cylinder. The fluid from the chamber 41 passes between the valve 63 and its seat into an internal chamber 65 formed within the plug 61 and from this chamber the fluid passes through a suitable number of radial passages 66 into a circumferential passage 67 and from the latter the fluid discharges into the pipe 10 attached to the pipe 8, the fluid, usually oil, being thereby returned to the release tank 12.

The operation of the valve or cock may be described briefly as follows:—Assuming that the low and high pressure fluids are conducted to the valve through the pipes 6 and 7 respectively and that the press is in condition to begin the expressing operation, the handle 65 is turned in a direction to seat the valve 63 and unseat the valve 62, the passage 57 leading from the chokers being thereby connected to the passage 42 leading to the press cylinder. The low pressure fluid entering the chamber 26 from the pipe 6 acts upon the relatively large area of the valve 15 to hold the valve member in the right hand position as shown in Fig. 3, the low pressure fluid thus passing from the chamber 26 into the chamber 28 and from the latter such fluid passes through the passages 29 into the circumferential passage 30 and from the latter the low pressure fluid flows through the port 31, through the low pressure choker 32 and into the passage 57. As the valve 62 controlling the passage 57 at this time is unseated, the low pressure fluid will flow from the passage 57 through the passage 42 and into the press cylinder through the pipe 11. The rear end of the piston carrying the low pressure valve 15 is constantly acted upon by the fluid pressure in the press cylinder by reason of its connection therewith by the chamber 41 and the passage 39. The rear end of the piston carrying the valve 15 is of the same effective area (less the area occupied by the stem carrying the valve 16) as that end on which the valve 15 is formed while the valve 15 is unseated, and consequently when the fluid has accumulated in the press cylinder so as to reach, say, two-thirds of the initial pressure of the low pressure fluid, the valve member will be unbalanced owing to the action of the high pressure within the chamber 45 acting on the high pressure valve 16, the member carrying the valves 15 and 16 being thereby shifted in a direction to unseat the high pressure valve 16 and to seat the low pressure valve 15. The supply of low pressure fluid is thereby cut off and the high pressure fluid is simultaneously admitted to the press cylinder from the chamber 45, through the chamber 47, the circumferential passage 49, the port 50 and the high and low pressure chokers 51 and 32, the expressing operation being thereby continued without interruption so that the oil cannot cease to flow from the seed and, moreover, there is no appreciable waste in the use of the high pressure fluid as the shifting of the member carrying the high and low pressure valves is practically instantaneous. The instantaneous movement of the member carrying the high and low pressure valves is insured by forming the high pressure valve 16 with a tapered face whereby a relatively small area is exposed to the high pressure fluid while the valve 16 is closed, but when the valve starts to open the full area of the valve is exposed whereby the high pressure fluid will quickly overbalance the low pressure fluid acting on the valve 15. Moreover, by forming the valve 15 with a tapered face, the effective area of this valve when closed is reduced so that the valve is retained with certainty in its shifted position.

By providing a single member with the cut-off or controlling valves for the high and low pressure fluid in the manner described, a practically instantaneous closing of the low pressure valve and opening of the high pressure valve is effected, there being no opportunity for an interruption of the flow of the oil from the seed, and as the first part of the expressing operation is effected by the low pressure fluid alone and such operation is completed by the high pressure, there is no liability of an excessive compression at the press which may cause injury to or destruction of the press cloths and, moreover, no waste of the high pressure fluid occurs. The construction and arrangement of the chokers for the low and high pressure fluid is also advantageous because of the fact that when the dimensions thereof have been once determined, there is no adjustment to be provided for so that unskilled operators cannot tamper with the valve, and obviously, the construction of this part of the valve is very simple and inexpensive, and there is no valve seat to cut or wear under the action of the pressure fluid which is usually oil.

By so proportioning the valve as to cause the low pressure fluid to be cut off when the fluid in the press reaches, say, two-thirds of the initial pressure of the low pressure fluid, and instantaneously admitting the high pressure fluid at such time, the speed of the press is not diminished, and at the same time the surplus low pressure fluid thus reserved may be used advantageously in operating the press rapidly to a point where it is desirable that the high pressure fluid should take effect. By combining the high and low pressure valves in one element, not only is simplicity in construction obtained, but an instantaneous change from low to high pressure fluids is obtainable.

I claim as my invention:

1. A controlling valve for presses using low and high pressure fluids comprising a casing having means for receiving the low and high pressure fluids and conducting such fluids to a press cylinder, and a movable valve member carrying valves for the low and high pressure fluids and controlled in its operation by the pressure in the press cylinder.

2. A controlling valve of the class described comprising a casing having means for conducting low and high pressure fluids thereto and to the press, and a member controlled automatically by the pressure at the press for cutting off the supply of low pressure fluid and simultaneously admitting high pressure fluid thereto.

3. The combination of a press and a controlling valve comprising a casing having means for connecting it to sources of low and high pressure fluids, a passage leading to the press cylinder, and a ported chamber communicating with said passage, and a valve member having a surface within said ported chamber and also having means for admitting low pressure fluid to the press and cutting off the supply of high pressure fluid thereto when such member occupies one position and movable automatically under the fluid at press cylinder pressure acting on said surface of the valve member to cut off the low pressure fluid supply to the press and to admit high pressure fluid thereto.

4. The combination of a press and a controlling valve comprising a suitable casing having passages for connecting it to sources of low and high pressure fluid and also having an outlet passage connected to the press cylinder, a ported chamber being formed in the casing between the passages for the high and low pressure fluids and communicating with the outlet passage to the press cylinder, and a member having opposed valve surfaces controlling the flow of high and low pressure fluids from their respective passages into the outlet passage connected to the press cylinder and operative to admit low pressure fluid to the press when moved in one direction and operative to cut off the supply of low pressure fluid to the press and to admit high pressure fluid thereto when moved in an opposite direction, the said member having a surface contained within and subjected to the fluid pressure in the said ported chamber for automatically effecting such movement.

5. A controlling valve for presses using low and high pressures, comprising a casing having means for receiving low and high pressure fluids and also having means for conducting such fluids to a press cylinder, and a movable member acted on by the pressure accumulated in the press cylinder and provided with valves adapted first to admit low pressure fluid to the press cylinder and operable automatically under the influence of the pressure accumulated in the press cylinder to interrupt the supply of low pressure fluid and admit high pressure fluid to the press cylinder.

6. The combination of a press, sources of low and high pressure fluid supply, and a controlling valve comprising a casing connected to the sources of low and high pressure fluid supply and to the press cylinder, oppositely arranged valve seats communicating respectively with the sources of low and high pressure fluid supply, and a member reciprocable in said casing and acted on by the pressure in the press cylinder, said member having valves arranged to coöperate alternately with the respective seats when shifted in opposite directions.

7. A valve of the class described comprising a casing having inlets for receiving fluid from different sources of supply, a pair of valve seats for the respective inlets, and a movable valve member having connected valve portions operative to interrupt the flow of one fluid and simultaneously admit the other fluid and provided with an intermediate surface adapted to be subjected to the action of a controlling fluid pressure.

8. A valve of the class described comprising a casing having inlets to receive low and high pressure fluids and also having an outlet for conducting the low and high pressure fluids to a press cylinder, a valve seat of relatively large area for the low pressure fluid inlet and a valve seat of relatively smaller area for the high pressure fluid inlet, and a valve member movably mounted in the casing and having connected valves of different areas thereon to coöperate with the respective seats for the low and high pressure fluids, said member being provided with a surface subject to fluid pressure in said outlet whereby said member is automatically operative to close the relatively large valve seat and simultaneously open the smaller valve seat.

9. A valve of the class described comprising a casing having inlets to receive low and high pressure fluids, valve seats of different relative sizes and of tapered form for said inlets, and a valve member reciprocable within the casing and having conical valve surfaces to coöperate with the respective seats, said member being operative automatically to interrupt the flow of the low pressure fluid and to simultaneously admit the high pressure fluid.

10. A controlling valve for presses using low and high pressure fluids comprising a casing to receive the low and high pressure fluids, an outlet passage communicating with the press cylinder, and a ported chamber communicating with said outlet passage, oppositely arranged valve seats within the casing one for each inlet, and a movable valve member having valve surfaces thereon to coöperate alternately with the respective valve seats, said member having a surface contained within and subject to the pressure of fluid in the said ported chamber whereby said member is automatically operative to cut off the supply of low pressure fluid and admit high pressure fluid to the press cylinder when the pressure in the latter reaches a given point.

11. A valve of the class described comprising a casing having inlets to receive low and high pressure fluids, a passage to communicate with a press cylinder, and a releasing passage, a valve controlled by the pressure of the fluid in said passage for successively admitting low and high pressure fluids thereto, and a device operative to simultaneously interrupt the flow of said fluids to the press and for releasing the fluid from the press cylinder and relieving the fluid pressure upon said valve.

12. A fluid controlling valve comprising a casing having inlets to receive pressures from different sources and also having an outlet, a pair of valve seats removably mounted in opposite relation within said casing and at opposite sides and in communication with said outlet, and an automatically operative valve member having valve faces at its opposite ends to coöperate alternately with the respective valve seats and also having a surface subject to fluid pressure in said outlet whereby the movement of said valve is controlled.

13. A change valve of the class described comprising a suitable casing having inlets for the admission of low and high pressure fluids, and provided with an outlet passage, a valve member for automatically controlling the flow of fluids from their respective inlets to said outlet passage, and chokers of different but fixed sizes interposed between the valve member and said outlet passage.

14. A change valve for presses comprising a suitable casing having inlets for admitting low and high pressure fluids and provided with a passage to communicate with the press, an automatically operative valve member controlled by the pressure of fluid in the press for first admitting low pressure fluid thereto and subsequently interrupting the supply of low pressure and admitting high pressure to the press, a low pressure choker interposed between said passage communicating with the press and said valve member, and a high pressure choker interposed between said low pressure choker and said valve member.

In testimony whereof I have hereunto set my hand in presence of two subscribing witnesses.

ELLIS BRYAN ANDERSON.

Witnesses:
 CYRIL HART,
 E. K. LANGFORD.